Aug. 18, 1970   D. R. SKOYLES   3,524,684
ANTILOCK BRAKE SYSTEM

Filed Nov. 18, 1968   3 Sheets-Sheet 1

INVENTOR.
DEREK R. SKOYLES
BY
AGENT

Aug. 18, 1970  D. R. SKOYLES  3,524,684

ANTILOCK BRAKE SYSTEM

Filed Nov. 18, 1968  3 Sheets-Sheet 3

INVENTOR.

BY *DEREK R. SKOYLES*

*Frank R. ......*
AGENT

United States Patent Office 3,524,684
Patented Aug. 18, 1970

3,524,684
ANTILOCK BRAKE SYSTEM
Derek Robert Skoyles, East Grinstead, England, assignor, by mesne assignments, to U.S. Philips Corporation, New York, N.Y., a corporation of Delaware
Filed Nov. 18, 1968, Ser. No. 776,483
Claims priority, application Great Britain, Nov. 24, 1967, 53,600/67
Int. Cl. B60t 8/06
U.S. Cl. 303—21                    8 Claims

ABSTRACT OF THE DISCLOSURE

An antilock hydraulic brake control system for a wheeled vehicle. The brake fluid is circulated in a fluid pressure line and applied to the brake cylinder. The rotation of the wheels serve to operate a pump for recirculating the fluid. When the wheel locks the pump does not operate, the fluid pressure builds up in a reservoir and activates the pressure responsive valve which closes the fluid line. When the wheels resume rotating the pump again circulates the fluid and the valve opens the pressure line.

---

Figure 1:
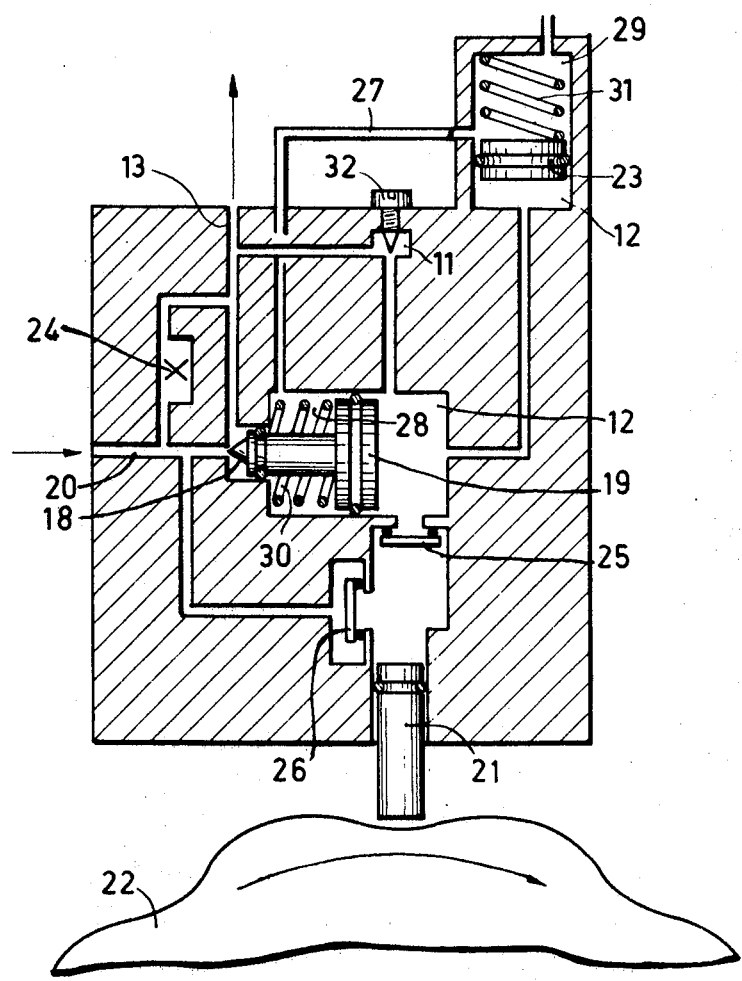

This invention relates to antilock brake systems for wheeled vehicles, i.e., systems designed to improve braking performance by releasing a wheel brake automatically if the wheel tends to lock on a slippery surface and then permitting further braking action without the need for any change in the action of the person using the brake. Such systems can be successful in reducing the risk of skidding due to wheel lock and maintaining directional control as well as for reducing braking distances.

In one known hydraulic system the fluid must be pumped continuously so as to supply circulation of oil to the brake, and the antilock control device bypasses some of the fluid from the brake cylinder when it is necessary to relieve the pressure therein. However, the continuously pumped supply of oil is difficult to achieve and expensive for use on a motor vehicle.

There are other antilock systems which have been proposed for use with hydraulic brake apparatus of the master-cylinder type, and examples of such antilock systems are described in British patent specification No. 1,101,078.

Copending application Ser. No. 771,561, filed Oct. 29, 1968, provides an alternative antilock brake control system which can employ relatively small and light equipment having relatively fast action. By contrast many previous antilock brake actuators have the disadvantage of being relatively bulky and heavy, this is due to the necessity of storing sufficient energy to reapply the brake after antilock action.

In its broadest aspect the invention of the copending application provides an antilock brake control system for a wheeled vehicle which system comprises a hydraulic pressure line from a master cylinder to a wheel brake controlled by the system, an antilock control valve adapted for actuation by an actuator in response to sensor signals from a wheel speed reduction sensor, a connection from said brake to a reservoir which connection is adapted to be opened by said antilock control valve when the latter is actuated, a scavenging pump for scavenging fluid from the said reservoir back to the brake and/or to the master cylinder, means for scavenging said pump in response to an increase in the volume of the fluid in said reservoir beyond a datum value, and limiting means for preventing or reducing further flow of fluid from the master cylinder to the brake during at least part of any period of antilock action. Such a sensor is used in conventional systems and may be associated with the wheel as a deceleration sensor which applies signals to an electromagnet via a suitable processing circuit or equivalent mechanical device.

By contrast, the present invention provides an antilock brake control system which does not require a separate wheel speed sensor.

In its broadest aspect the present invention provides an antilock brake control system for a wheeled vehicle which system comprises a hydraulic pressure line for connection from a source of fluid under pressure to a wheel brake controlled by the system, a leakage path from said brake to a reservoir to permit controlled escape of brake fluid during braking, a scavenging pump for scavenging fluid from the said reservoir back to the source end of said line, means for driving said pump from the wheel or from an element provided to drive or be driven by the wheel, and limiting means for preventing or reducing further flow of fluid from the said source to the brake which limiting means are adapted to act in response to an increase in the volume of the fluid in said reservoir beyond a datum value. In such a system the road wheel acts effectively as its own sensor and provides its own antilock control.

The system can be applied to a pair of wheels driven by a common propeller shaft via a differential gear, in which case the wheels of the pair can share a common leakage path and a common reservoir and pump, the pump being driven by said propeller shaft. Alternatively, the system may be one which is applied to a single wheel and comprises a leakage path and a reservoir and pump specific to said wheel and wherein the pump is driven by the wheel itself or an element positively coupled to said wheel.

The source of pressurized hydraulic fluid may be a master cylinder. The term "master cylinder" is used herein to cover not only the normal case in which the driver actuates directly the piston in the master cylinder, but also cases where a pneumatic servomechanism or amplifier is interposed between the driver and said piston.

In the examples illustrated and described below, the limiting means comprise a volume-limiting valve inserted in the pressure line provided between the source and the brake and controlled by a piston in the reservoir which piston is adapted to move within the reservoir in response to changes of volume in the reservoir.

A further preferred feature of the invention is the provision of a second smaller leakage path arranged (as will be described) for safety purposes between the master cylinder and the reservoir and/or brake, e.g., across the limiting means.

Specific embodiments of the invention will now be described by way of example with reference to the accompanying diagrammatic drawings. From these drawings it will be seen more clearly how the arrangements are designed to reduce hydraulic brake pressure when the wheel locks, and also to restore pressure when the wheel is accelerating from the locked or partially locked state. It will also be seen that each of the arrangements can be small and light because it does not have to store energy.

Figure 2:
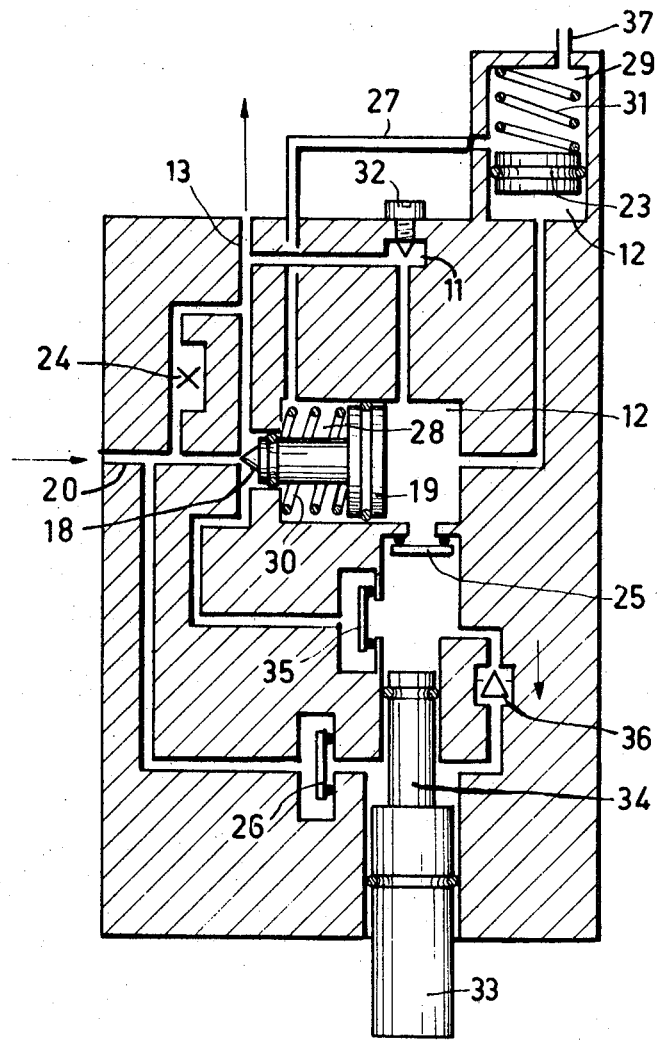
Figure 3:
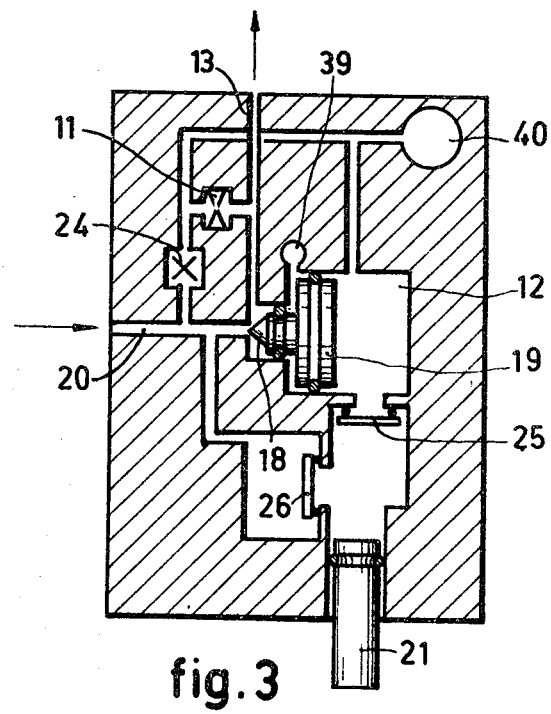
Figure 4:
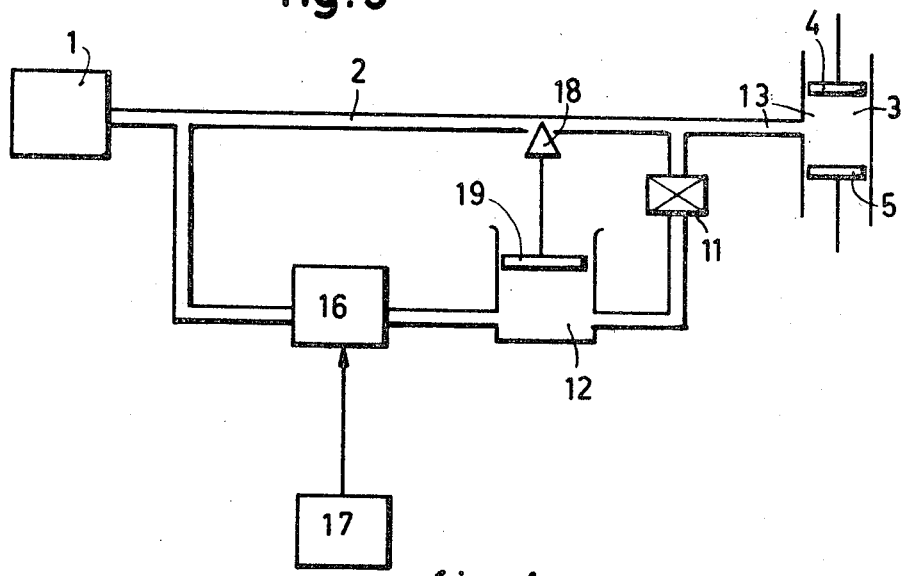

In the drawings:
FIGS. 1 to 3 show three detailed examples applied to systems of the master cylinder type while
FIG. 4 shows a simpler and less detailed example which is more suitable for the explanation of the general principles involved. For this reason it is convenient to describe this embodiment first.

In FIG. 4 a source 1 of fluid under pressure is shown connected by a pressure line 2 to a brake 3. The source is controlled by the driver and may be of the continuously pumped type referred to above or it may be a master cylinder as defined above.

The brake is indicated as a conventional brake cylinder arranged to actuate two pistons 4, 5 linked to brake shoes but other brake arrangements can be used in this example.

A permanent leakage path 11 is provided from the brake to a reservoir 12 to permit controlled escape of brake fluid during braking and said path can be taken, e.g., from the brake cylinder itself or (as shown) from a line 13 leading to the brake and constituting an end portion of the pressure line from the source to the brake (since these alternatives are equivalent, the expression "leakage path from the brake" is used to cover both).

The system also includes a scavenging pump 16 for scavenging fluid from the reservoir 12 back to the source end of the line and means 17 for driving said pump from the wheel or from an element provided to drive or be driven by the wheel.

This example can be applied to a pair of wheels driven by a common propeller shaft via a differential box, the wheels of the pair sharing a common leakage path 11 and a common reservoir 12 and pump 16, the pump being driven by said propeller shaft acting as the element 17 (the line 13 should in this case be regarded as supplying the brakes of both wheels).

Alternatively, the system of FIG. 4 may be applied to a single wheel. The system then comprises a leakage path 11 and a reservoir 12 and pump 16 specific to said wheel, the element 17 being a part of the wheel itself or an element positively coupled to said wheel. The further description of the drawings will be based on this alternative for the sake of clarity.

The system also includes a valve 18 but, neglecting the latter at this stage, the operation under nonskid conditions is as follows. The brake is applied by pressurized fluid supplied from the source. Part of such fluid escapes via leakage path 11 to the reservoir 12, but this loss of fluid is made up by the action of the pump 16 in scavenging fluid from 12 and returning it under pressure to the line. Thus, so long as there is no wheel lock, the braking action continues with the aid of circulation of fluid in the loop 11–12–16, and the volume of fluid in 12 is kept below a predetermined datum by the action of the pump.

However, if the wheel locks or tends to lock, the action of the pump 16 is stopped or reduced although the leakage path 11 remains open. Consequently, the volume of fluid in reservoir 12 will start to increase while the supply of fluid decreases. (This increase of volume in 12 implies that 12 is effectively open to a pressure low enough to free the wheel under all antilock conditions.) In the conventional case of a master-cylinder source controlled by a foot pedal, this would mean a continued downward movement of the foot until the pedal reaches its limit position, resulting in a low effective brake pressure. To avoid this type of situation, it is necessary to provide limiting means to stop or reduce the flow of fluid in the line as soon as the wheel locks. This condition can be detected without a separate wheel speed reduction sensor since (as mentioned above) it is accompanied by an increase in the volume of fluid in the reservoir 12. The desired limiting function is achieved by providing limiting means 18–19 for preventing or reducing further flow of fluid from the source to the brake which limiting means act in response to an increase in the volume of the fluid in reservoir 12 beyond a datum value (or in response to pressure).

In a simple case, the element 19 may be a piston which is slidable in the reservoir 12 to allow changes in volume to occur freely. Piston 19 may be biased inwardly by a spring and said piston is coupled to a valve 18 which blocks the line (either completely or partially, as will be explained) when forced upwards by piston 19.

FIG. 1 shows a more detailed arrangement which employs an input pressure line 20 for connection to the master cylinder, an output line 13 for connection to a brake cylinder, and a piston 21 which projects from the unit for actuation by a cam 22 or equivalent (shown schematically) on or driven by the wheel. As will be explained, the piston 21 is only forced out of its cylinder into contact with the cam or equivalent when repumping is required by the prevailing braking conditions.

In addition, the system of FIG. 1 employs a volume limiting valve 18 carried by a piston 19, a spring-loaded piston 23 operating effectively in the same reservoir 12 as piston 19, a hydraulic connection from the brake line 13 to said chamber 12 via a first leakage path 11, and a further connection from the pressure line 20 to the reservoir 12 (as shown) or to the line 13 via a second leakage path 24. The action of the piston 21 as a pump is ensured by valves 25 and 26, the latter being in an outlet connection back to the line 20. Finally, there is a connection 27 between the chambers 28 and 29 on the outer sides of pistons 19–23 which chambers house springs 30–31 respectively.

The operation of the arrangement of FIG. 1 is as follows.

(1) Pressure is supplied from the master cylinder (or other pressure supply) to the brake via valve 18 which is normally kept open by spring 30. A restrictor 32 provides a main leakage path 11 to allow escape of fluid from the brake.

(2) Due to this leakage, pressure builds up in the reservoir cavity 12 enclosed by pistons 19–23 and pushes down a piston 21 to a cam 22 rotating with the wheel hub.

(3) The cam pushes piston 21 up and this pumping action (with the aid of valves 25–26) scavenges the reservoir and returns the fluid via valve 26 to the pressure supply line 20.

(4) When the wheel locks, piston 21 comes to rest, and the reservoir pressure is increased because fluid is no longer scavenged by the pump. The increased pressure seals valve 18 preventing further pressure buildup in the brake. It also pushes back piston 23 thereby allowing a flow of fluid from the brake via the leakage path 11.

(5) When sufficient fluid has been released from the brake the wheel will unlock and the scavenging will again begin.

(6) When the pressure in the reservoir 12 is sufficiently low, valve 18 opens allowing pressure to the brake which will then relock the wheel.

It may be advantageous to provide means for ensuring that valve 18 opens gradually to prevent a sudden "relock."

It may also be advantageous to pump some of the fluid directly to the brake cylinder instead of all to the master cylinder. This may be done as shown in FIG. 2 by replacing piston 21 with a double piston 33–34. Part 33 operates as before, while part 34 pumps fluid direct to line 13 via an additional valve 35. A line with a one-way valve 36 is provided to allow passage of fluid in one direction (from 34 to 33), but this can be replaced by a flexible "lip" seal provided round part 34 in place of the O-ring shown in the drawing.

In FIGS. 1 and 2 the reservoir 29 has a vent 37 (so that it is always at atmospheric pressure). It is drawn above valve 18 so as to prevent the escape of oil from the chamber of spring 30 via line 27.

Actually, line 27 is optional and is not suitable for all types of piston. In any case it merely acts as a safety device (in case piston 23 moves too far up) and it does not take part in the normal operation of the device.

In conclusion, both embodiments illustrate the following safety features:

(1) A slow leakage from the master cylinder is to the brake via leakage path 11 allows final restoration of brake pressure if valve 18 fails to open. It also allows braking when the vehicle is at rest.

(2) A safety port (=vent 37) in the chamber 29 (at one end of line 27) allows reservoir fluid to overcome the action of valve 18 if piston 23 has moved too far upwards. This is a safety feature in the event of pump failure or restrictor failure at 11. It also allows braking when the vehicle is at rest.

A simplified embodiment is shown in FIG. 3 where the spring 30 is omitted and replaced by an expansion chamber 39. Moreover, the reservoir is shown as a plain cavity 40 without the spring 31 and piston 23 of FIGS. 1–2.

What is claimed is:

1. An antilock brake control system for a wheeled vehicle which comprises a source of fluid under pressure, a hydraulic pressure line for connecting the source of fluid to a wheel brake controlled by the system, a reservoir, a leakage path from said brake to the reservoir for permitting controlled escape of brake fluid during braking, a scavenging pump for circulating fluid from the reservoir back to the fluid source, means for driving said pump in response to rotation of the unlocked wheel, and limiting means for reducing flow of fluid from the source to the brake when the wheel is locked said limiting means being activated by the increased pressure of the fluid in the reservoir.

2. An antilock brake system for use with a wheeled vehicle having a source of pressurized fluid communicating with the wheel brake through a pressure line and comprising a fluid reservoir, conduit means connecting the brake and the reservoir for conducting some of the fluid to the reservoir, pump means for recirculating the fluid from the reservoir back to the fluid source, said pump means operating in response to the wheel rotation, and limiting means for reducing the fluid flow in the pressure line when the wheel is locked and the pump is inoperative, said limiting means being activated by fluid accumulation in the reservoir.

3. An antilock brake system as claimed in claim 2 wherein the conduit means comprises a leakage path from the brake to the reservoir, and further includes a restrictor in said conduit for controlling the flow therethrough.

4. An antibrake system as claimed in claim 3 wherein the pump means comprises a pump piston, and valve means for insuring a circulatory fluid flow from the reservoir and back to the fluid source.

5. An antilock brake system as claimed in claim 4 wherein the limiting means comprises a valve member extending into the pressure line between the source of fluid and the brake, and a piston positioned in the reservoir and attached to the valve, said piston being activated in response to change in the volume of fluid in the reservoir to thereby control the movement of the valve.

6. An antilock brake system as claimed in claim 5 further including an additional leakage path between the source of fluid and the wheel brake as a safety precaution, said additional leakage path avoids the limiting valve and can provide for direct application of the fluid to the brake.

7. An antilock brake system as claimed in claim 6 wherein the pump means comprises a double piston and passage means for circulating some of the fluid directly to the brake.

8. An antilock brake system as claimed in claim 7 wherein the source of fluid is from a master cylinder in the brake system.

References Cited
UNITED STATES PATENTS

| | | | |
|---|---|---|---|
| 2,919,162 | 12/1959 | Roberts | 303—21 |
| 3,032,995 | 5/1962 | Knowles. | |
| 3,089,734 | 5/1962 | Jankus | 303—61 X |
| 3,276,822 | 10/1966 | Lister et al. | |

MILTON BUCHLER, Primary Examiner

J. J. McLAUGHLIN, Jr., Assistant Examiner

U.S. Cl. X.R.

303—10, 61